United States Patent
Carpio et al.

(10) Patent No.: US 9,628,321 B2
(45) Date of Patent: *Apr. 18, 2017

(54) PACKET FILTERING BASED ON DYNAMIC USAGE INFORMATION

(71) Applicants: SONY CORPORATION, Tokyo (JP); Sony Electronics Inc., Park Ridge, NJ (US)

(72) Inventors: Fredrik Carpio, San Diego, CA (US); Milton Massey Frazier, San Marcos, CA (US); Nikolaos Georgis, San Diego, CA (US)

(73) Assignees: Sony Electronics Inc., Park Ridge, NJ (US); SONY CORPORATION, Tokyo (JP)

(*) Notice: Subject to any disclaimer, the term of this patent is extended or adjusted under 35 U.S.C. 154(b) by 18 days.

This patent is subject to a terminal disclaimer.

(21) Appl. No.: 13/899,962

(22) Filed: May 22, 2013

(65) Prior Publication Data

US 2013/0259066 A1 Oct. 3, 2013

Related U.S. Application Data

(63) Continuation of application No. 12/142,117, filed on Jun. 19, 2008, now Pat. No. 8,526,469.

(51) Int. Cl.
*H04L 29/08* (2006.01)
*H04L 12/24* (2006.01)

(52) U.S. Cl.
CPC ........ *H04L 29/08972* (2013.01); *H04L 41/12* (2013.01); *H04L 67/325* (2013.01); *H04L 67/327* (2013.01)

(58) Field of Classification Search
CPC .............. G06F 17/30867; G06Q 30/02; G06Q 30/0269; G06Q 30/0273; H04N 21/482
See application file for complete search history.

(56) References Cited

U.S. PATENT DOCUMENTS

| | | | |
|---|---|---|---|
| 7,779,458 B1* | 8/2010 | Heiderscheit | H04L 63/0227 726/11 |
| 2003/0120935 A1* | 6/2003 | Teal | G06F 21/57 713/188 |
| 2004/0190467 A1* | 9/2004 | Liu et al. | 370/311 |
| 2004/0190522 A1* | 9/2004 | Aerrabotu | H04L 29/12009 370/395.3 |
| 2004/0223599 A1* | 11/2004 | Bear | H04M 3/436 379/207.02 |
| 2006/0041926 A1* | 2/2006 | Istvan et al. | 725/133 |
| 2006/0209857 A1* | 9/2006 | Hicks, III | G08B 25/08 370/401 |
| 2006/0253399 A1* | 11/2006 | Chatani | 705/52 |
| 2007/0300296 A1* | 12/2007 | Kudla | H04L 63/0263 726/13 |
| 2008/0089277 A1* | 4/2008 | Alexander | H04L 12/2816 370/328 |
| 2008/0120683 A1* | 5/2008 | Frazier et al. | 725/141 |

(Continued)

*Primary Examiner* — Chirag Shah
*Assistant Examiner* — Rina Pancholi
(74) *Attorney, Agent, or Firm* — John L. Rogitz

(57) ABSTRACT

A receiver of network data dynamically filters packets by packet type from a network device CPU based on usage information, such as time, day, location, and feature (e.g., "video" or "application") selection.

19 Claims, 2 Drawing Sheets

(56) References Cited

U.S. PATENT DOCUMENTS

| | | | |
|---|---|---|---|
| 2008/0205396 A1* | 8/2008 | Dakshinamoorthy | H04L 12/1886 370/390 |
| 2008/0276311 A1* | 11/2008 | Kassovic ............ | H04L 63/0227 726/11 |
| 2008/0310446 A1* | 12/2008 | Bellwood et al. ............ | 370/468 |
| 2009/0005076 A1* | 1/2009 | Forstall et al. ............ | 455/456.2 |
| 2010/0054222 A1* | 3/2010 | Rune ................. | H04L 29/12066 370/338 |

* cited by examiner

PACKET FILTERING BASED ON DYNAMIC USAGE INFORMATION

I. FIELD OF THE INVENTION

This application relates to filtering network packets based on dynamic usage information associated with a receiving networked device.

II. BACKGROUND OF THE INVENTION

Networked devices such as computers can receive a great amount of data from the network. The processors of such devices clearly must process the data. As understood herein, much of the received data might not be required depending on the ambient usage of the device, but must nonetheless be processed by the receiving processor, and this is undesirable, particularly in the case of portable battery-powered devices.

SUMMARY OF THE INVENTION

A receiver of network data includes a processor causing the receiver to dynamically filter network packets by packet type from a network device central processing unit (CPU) based on usage information.

The usage information may include, e.g., time, day of the week location of the network device, feature selection, or some combination thereof. The receiver can be implemented in the network device and if desired the receiver wirelessly receives packets from the network. The network device can be battery powered.

In another aspect, a method includes receiving dynamic usage information pertaining to a network device, and based on the dynamic usage information, determining at least one desired packet type from a network. The method passes, from a packet receiver of the network device to a central processing unit (CPU) of the network device, only the packets determined to be desired.

In another aspect, an apparatus has a housing, a data receiver in the housing, and a central processor unit (CPU) in the housing and receiving data from the data receiver. The CPU has at least first and second operational states. The data receiver receives packets having a first type and packets having a second type and sends packets having the first type to the CPU but does not send packets having the second type to the CPU when the CPU is in the first operational state. On the other hand, the data receiver does not send packets having the first type to the CPU and sends packets having the second type to the CPU when the CPU is in the second operational state.

The details of the present invention, both as to its structure and operation, can best be understood in reference to the accompanying drawings, in Which like reference numerals refer to like parts, and in which:

DETAILED DESCRIPTION OF THE PREFERRED EMBODIMENT

Figure 1:
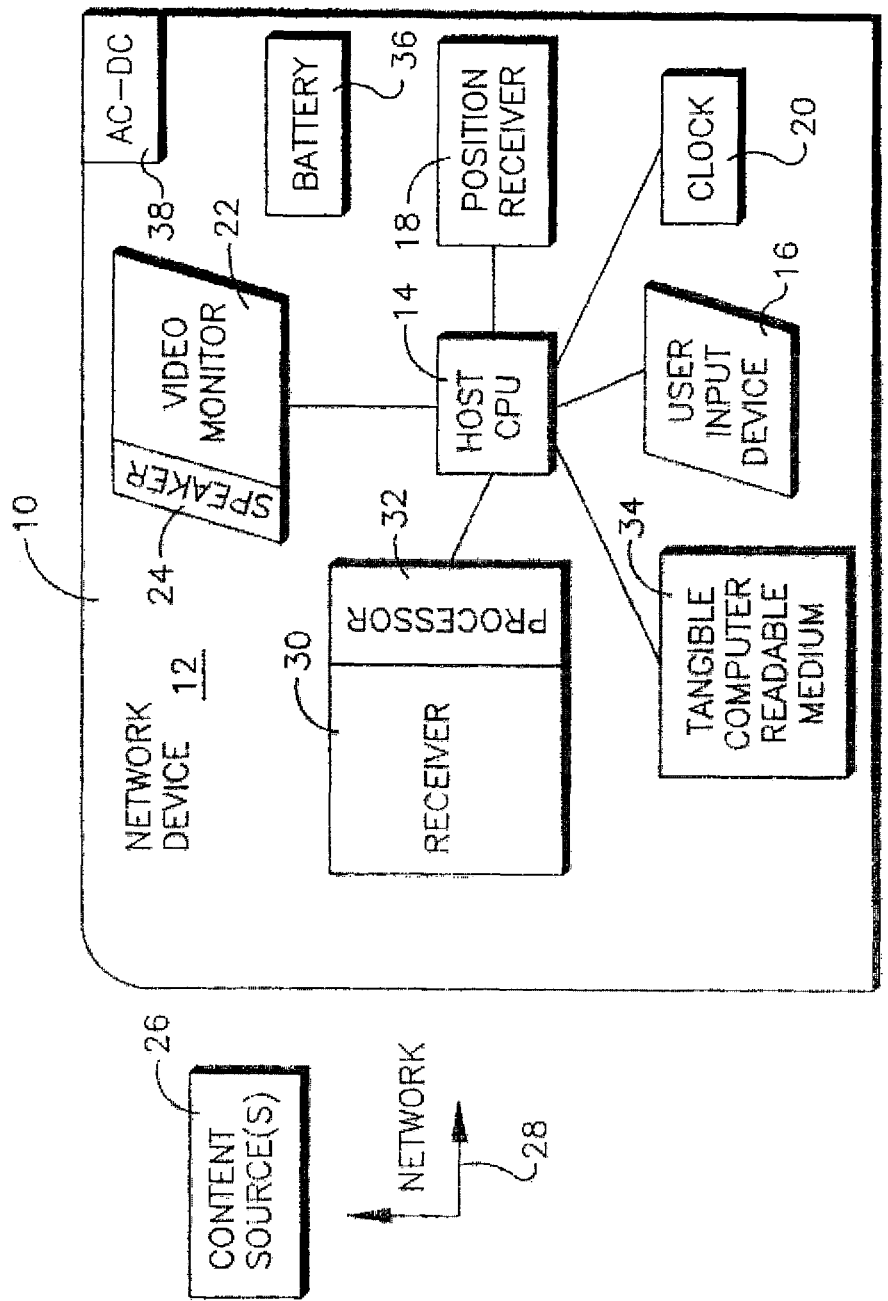
FIG. 1 is a block diagram of an example network device with filtering receiver.

Referring initially to FIG. 1, a network device 10 may have a lightweight portable housing 12 containing a host central processing unit (CPU) 14 that can be implemented by, e.g., a suitable computer processor. The CPU 14 can receive user input from a user input device 16, such as but not limited one or more of a keyboard, mouse, keypad, trackball, voice recognition module, etc. The CPU 14 may also receive, in some embodiments, position input from a position receiver 18 such as but not limited to a global positioning satellite (GPS) receiver, and from a clock 20. The CPU 14 may output video data on a monitor 22 such as a computer monitor, flat panel display, or even cathode ray tube or other monitor. The CPU 14 can also output audio data on one or more speakers 24.

As shown in FIG. 1, the CPU 14 may receive data from content source(s) 26 over a network 28 such as but not limited to the Internet by means of a data receiver 30 with receiver processor 32. The receiver 30 may be a wired or wireless receiver that receives data packets from the network 28, with the packets typically bearing tags indicating their data type. Thus, the receiver 30 may include, without limitation, a wired modem or a wireless modem that may receive Bluetooth signals or WiFi signals. The receiver 30 may be implemented as a receiver module or integrated circuit, for example.

The CPU 14 may access a tangible computer readable storage medium 34 to store data thereon and to access computer instructions stored thereon to execute the logic herein. The medium 34 may represent, without limitation, any one or a combination of solid state storage, disk storage, removable and non-removable storage, etc.

As shown in FIG. 1, the components of the network device 10 may be powered by one or more direct current (DC) batteries 36, for portability. The network device 10 may also receive alternating current (AC) power from the AC grid through an AC-DC converter 38. In non-limiting implementations the network device 10 may be implemented as a portable computer such as a laptop or notebook computer, a personal digital assistant, or a wireless telephone.

Figure 2:
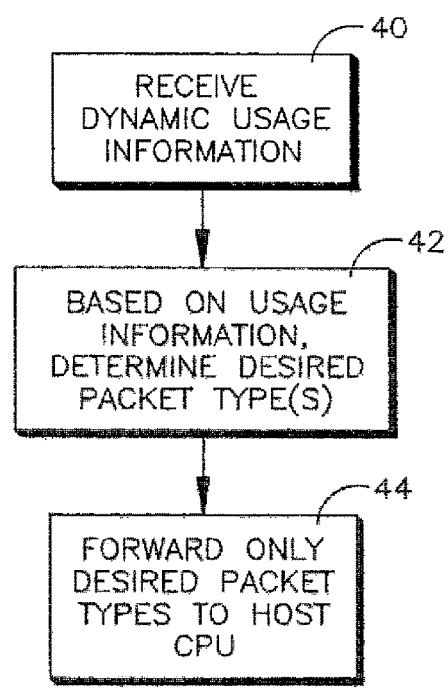
FIG. 2 is a flow chart of example logic that can be implemented by the device of FIG. 1.

FIG. 2 illustrates logic that may be employed by the device 10 shown in FIG. 1. Commencing at block 40, dynamic usage information pertaining to the network device 10 is received. In one implementation this usage information is received by the CPU 14. The dynamic usage information may include time of day and day of the week from the clock 20, location of the device 10 from the position receiver 18, and user preference as indicated by input received from the user input device 16. As an example of the latter, the user may have opened a "video" feature of the device 10.

Moving to block 42, based on the dynamic usage information, desired packet types from the network 28 are determined. For example, if the user has selected a "video" feature, it is determined at block 42 that video packets are desired but not, e.g., binary application packets, whereas if the user changes to, e.g., an "application" feature selection, the desired packet types may include binary application packets but not video packets. As another example, only binary application packet types might be determined to be desired at block 42 if the time of day indicates operation during business hours, whereas the desired packet type might switch to video after business hours. As yet another example, only binary application packet types might be determined to be desired at block 42 if the clock 20 indicates operation during a weekday, whereas the desired packet type might switch to video on the weekend. As yet another example, if the position receiver 18 indicates a location at work or in an airport, only binary application packets, but not video packets, might be determined to be desired at block 42. Certain packet types such as, for example, emergency packet types might always be included in the desired type(s) at block 42.

Proceeding to block 44, only the packets determined to be desired at block 42 are passed from the receiver 30 to the CPU 14. In one embodiment, the CPU 14 undertakes the logic at block 42 and sends a signal to the receiver 30 at block 44 indicating the desired packet types, with the receiver processor 32 then passing to the CPU 14, based on, e.g., packet tags indicating packet type, only packets of the desired type(s) to the CPU 14. Packets that are not of the desired type(s) are in effect filtered by the receiver 30 from the information passed to the CPU 14.

In other implementations, the dynamic usage information at block 40 may be sent to the receiver processor 32, which performs the logic of block 42 and in response forwards only desired packets to the CPU 14 at block 44.

In any case, the logic of FIG. 2 loops, so that, for instance, if the user has selected the video feature and the receiver 30 consequently passes to the CPU 14 video packets but not binary application packets, and then the user selects an "application" feature, the receiver 30 stops sending video packets to the CPU 14 and begins sending binary application packets. The filtering function of the receiver 30 likewise can dynamically change based on changes in time, day, location in accordance with principles above.

While the particular PACKET FILTERING BASED ON DYNAMIC USAGE INFORMATION is herein shown and described in detail, it is to be understood that the subject matter which is encompassed by the present invention is limited only by the claims.

What is claimed is:

1. A receiver of network data comprising:
at least one non-transitory computer storage medium with instructions which when executed by at least one processor configure the processor for:
causing the receiver to filter received network packets by packet type from a network device central processing unit (CPU) based on dynamic usage information, such that the CPU receives only some packets received by the receiver from at least a first source but not all packets from at least the first source according to the usage information, wherein the usage information by which packets are filtered is established by time of day, and/or day of the week, and/or physical location of the network device, wherein the network packets are filtered by packet type according to the usage information at least in part based on a respective packet type indicators associated with received respective network packets, wherein the respective packet type indicators respectively indicate packet types for their associated respective network packet;
responsive to a user selecting a "video" feature, pass video packets received by the receiver to the CPU but not pass, from the receiver to the CPU, binary application packets received by the receiver, and responsive to a user changing to an "application" feature selection, pass binary application packets but not video packets.

2. The receiver of claim 1, wherein the usage information includes time.

3. The receiver of claim 1, wherein the usage information includes day of the week.

4. The receiver of claim 1, wherein the usage information includes physical location of the network device.

5. The receiver of claim 1, wherein the usage information includes feature selection.

6. The receiver of claim 1, wherein the receiver is implemented in the network device.

7. The receiver of claim 6, wherein the instructions when executed by the processor configure the processor to wirelessly receive packets from the network and the network device is battery powered.

8. A method comprising:
receiving iterative usage information pertaining to a network device;
based on the usage information, determining at least one desired packet type; and
passing, from a packet receiver of the network device to a central processing unit (CPU) of the network device, only the packets determined to be of the at least one desired packet type, wherein the usage information is established at least by physical location of the network device;
wherein responsive to a user selection of a "video" feature, the desired packet type includes video packets but not binary application packets, wherein responsive to a user selection of an "application" feature, the desired packet type includes binary application packets but not video packets.

9. The method of claim 8, wherein the usage information includes time of day.

10. The method of claim 8, wherein the usage information includes day of the week.

11. The method of claim 8, wherein the usage information includes user preference as indicated by input received from a user input device.

12. The method of claim 11, wherein the user preference is a "video" feature or an "application" feature of the network device.

13. The method of claim 8, wherein at least a first packet type is always passed to the CPU regardless of the usage information.

14. The method of claim 13, wherein the first packet type is an emergency packet type.

15. The method of claim 8, wherein the CPU executes the receiving and determining acts.

16. The method of claim 8, wherein the packet receiver executes the receiving and determining acts.

17. The method of claim 8, wherein all packets that are passed are of one packet type.

18. A device, comprising:
a central processing unit (CPU);
a packet receiver accessible to the processor; and
storage accessible to the processor and bearing instructions executable by the processor to:
based on non-static usage information pertaining to the device, determine at least one desired packet type; and
pass, from the packet receiver to the CPU, only packets received over a network that are determined to be of the at least one desired packet type, wherein the usage information is established at least by a current physical location of the device;
wherein responsive to a user selection of a "video" feature, the desired packet type includes video packets but not binary application packets, wherein responsive to a user selection of an "application" feature, the desired packet type includes binary application packets but not video packets.

19. The device of claim 18, wherein the usage information is further established at least by time of day and/or day of the week.

* * * * *